(12) United States Patent
Wolterink et al.

(10) Patent No.: US 9,170,402 B2
(45) Date of Patent: Oct. 27, 2015

(54) OPTICAL UNIT

(75) Inventors: Edwin Maria Wolterink, Valkenswaard (NL); Yelena Vladimirovna Shulepova, Eindhoven (NL); Koen Gerard Demeyer, Genk (BE)

(73) Assignee: ANTERYON INTERNATIONAL B.V., CA Eindhoven (NL)

(*) Notice: Subject to any disclaimer, the term of this patent is extended or adjusted under 35 U.S.C. 154(b) by 49 days.

(21) Appl. No.: 14/002,312

(22) PCT Filed: Mar. 1, 2012

(86) PCT No.: PCT/NL2012/050122
§ 371 (c)(1),
(2), (4) Date: Oct. 8, 2013

(87) PCT Pub. No.: WO2012/161570
PCT Pub. Date: Nov. 29, 2012

(65) Prior Publication Data
US 2014/0022650 A1    Jan. 23, 2014

(30) Foreign Application Priority Data
Mar. 11, 2011  (NL) ..................................... 2006373

(51) Int. Cl.
*G02B 9/00* (2006.01)
*G02B 13/00* (2006.01)

(52) U.S. Cl.
CPC .......... *G02B 13/001* (2013.01); *G02B 13/003* (2013.01); *G02B 13/006* (2013.01); *G02B 13/0085* (2013.01)

(58) Field of Classification Search
CPC .............. G02B 9/00; G02B 6/06; G02B 9/08; G02B 9/10; G02B 13/0085; G02B 13/001; G02B 13/006; G02B 13/003
USPC ........................................ 359/740, 793–795
See application file for complete search history.

(56) References Cited

U.S. PATENT DOCUMENTS

| | | | |
|---|---|---|---|
| 7,654,757 B2* | 2/2010 | Okumura | 396/505 |
| 2008/0094738 A1 | 4/2008 | Lee | |
| 2009/0050946 A1 | 2/2009 | Duparre et al. | |
| 2010/0002314 A1 | 1/2010 | Duparre | |
| 2010/0053770 A1* | 3/2010 | Sato et al. | 359/717 |
| 2010/0073534 A1 | 3/2010 | Yano et al. | |
| 2011/0002053 A1* | 1/2011 | Ovrutsky et al. | 359/738 |
| 2011/0013290 A1 | 1/2011 | Shigemitsu et al. | |
| 2011/0255856 A1* | 10/2011 | Reshidko et al. | 396/439 |
| 2012/0033125 A1* | 2/2012 | Tang et al. | 348/340 |

FOREIGN PATENT DOCUMENTS

EP        2113800       11/2009

OTHER PUBLICATIONS

International Search Report mailed May 25, 2012, International Patent Application No. PCT/NL2012/050122.

* cited by examiner

*Primary Examiner* — Darryl J Collins
(74) *Attorney, Agent, or Firm* — Casimir Jones, S.C.

(57) ABSTRACT

The present invention relates to optical unit comprising, seen in the direction from the object side to the imaging surface, a first substrate, a first lens, a second lens and a second substrate, characterized in that the distance [(vertex first lens) and (vertex second lens)] is 250-650 pm. Such an optical unit is used, inter alia, in image processing units, such as cameras. It is an object of the present invention to provide an optical unit in which the desired dimensional precision of the lens system can be accomplished without this leading to an undesirable increase of the optical unit's dimensions.

20 Claims, 14 Drawing Sheets

PRIOR ART

Fig. 13

Fig. 14

OPTICAL UNIT

The present invention relates to an optical unit. The present invention further relates to the use of such an optical unit. The optical unit can be regarded as an assembly of lenses, comprising, seen in the direction from the object side to the imaging surface, a first substrate, a first lens, a second lens and a second substrate.

Optical units are known per se, they are used, inter alia, in camera systems, the aim in the development of such systems always being to obtain ever smaller, lighter, thinner, better and cheaper camera systems. From International application WO 2004/027880 in the name of the present applicant, for example, there is known a camera system comprising an image capturing element, a lens element for imaging an object at the image capturing element, a spacer for maintaining a predetermined distance between the lens element and the image capturing element, whilst furthermore a lens substrate is provided, on which the lens is disposed.

From U.S. Pat. No. 6,985,037 there is furthermore known a lens assembly, in which document it is indicated that the optical length, which is defined as the distance from the object side of the imaging lens to the image-forming surface of a CCD or the like, must be small. Such a lens is frequently referred to as a compact lens, in which regard it is a requirement, for example in a mobile telephone, that the optical length must be at least less than the thickness of the telephone itself. Furthermore, the lens must be configured so that the image obtained by means of such a lens is visually acceptable.

U.S. Pat. No. 6,985,307 thus provides a lens assembly made up of a first lens, a second lens and a third lens, of which lens special requirements are made as regards the curvature, the distance between the lenses and the thickness of the lenses being used.

From International application WO 2008/011003 there is furthermore known a camera system comprising three substrate layers, on which five optical elements are formed.

In non-prepublished NL application No. 2005164 in the name of the present applicant there is described an optical unit comprising a first substrate, a first lens, a second lens and a second substrate, the first substrate comprising a diaphragm function realised by applying a coating on the surface of the first substrate so as to obtain an aperture on the aforesaid surface.

From U.S. application US 2010/0002314 there is known a lens system comprising an inner lens structure and an outer lens structure, said inner lens structure comprising a positive lens, a first transparent substrate and a negative lens, and the outer lens structure comprising a positive lens, a second transparent substrate and a negative lens. Glass is mentioned as a substrate material, on which lenses are provided via a replication method. The diaphragms used in said lens systems are disposed on the glass substrate. From European application EP 2 113 800 there is known an image pickup lens comprising an imaging sensor, a first lens substrate and a second lens substrate, on either side of which first lens substrate a first lens and a second lens, respectively, is present, whilst a third and a fourth lens are present on respective sides of the second lens substrate. Present between the first lens and the first lens substrate is an aperture stop obtained by using a coating method. The diaphragms used in said lens systems are disposed on the substrate.

From US 2011/013290 there is known an image pickup lens comprising an aperture stop, a first lens and a second lens.

From US 2010/0073534 there is known an optical element comprising an optical surface, a spacer and an adhesive.

From International application WO 2009/076790 there is known a method for replicating an optical element, wherein a lens formed from a material is present in an apertured carrier, which carrier has a mechanical function, viz. as a spacer.

From Japanese publication JP 2009-229749 there is known an optical element, in which a chrome plating layer is disposed on a glass substrate.

The camera modules used in mobile telephones require ever more resolution and optical functionalities to be realised within ever smaller dimensions. Thus, new lens systems comprising an assembly of lenses need to be designed, which lenses must exhibit at least the same dimensional precision as the previously produced lenses. In addition to that, the picture quality of such camera modules must be good or improved in comparison with that of the currently known modules. The present applicant has further found that, using the current production methods, considerable efforts are required for controlling the intended dimensional precision and picture quality.

Thus it is an object of the present invention to provide an optical unit in which the desired dimensional precision of the lens system can be accomplished without this leading to an undesirable increase of the optical unit's dimensions.

Another object of the present invention is furthermore to provide an optical unit exhibiting a high picture quality, in particular as regards MTF and lateral colour deviation.

Another object of the present invention is to provide an optical unit, viz. a lens assembly, in which the nominal performance and the performance after tolerances are in equilibrium.

The invention as described in the introduction is characterised in that the distance [(vertex first lens) and (vertex second lens)] is 250-650 µm.

According to the present applicant it has been found possible, using such an optical unit, in particular by quantifying the distance between the vertex first lens and the vertex second lens, to manufacture a system of lenses, in particular the optical unit, in which the specific distance as mentioned before provides an optimum balance between the intended optical properties and the dimensions of the optical unit itself. The term "vertex" is to be understood to mean the local maximum of a curvature. The term will be explained in more detail hereinafter in the description of the figures. The phrase "vertex to vertex" is to be understood to mean that the distance from the rise of arc of the first lens up to and including the second lens.

In a special embodiment it is preferable if, seen in the direction from the object side to the imaging surface, a third lens is disposed behind the second lens, which third lens abuts against a substrate.

If the distance vertex first lens and vertex second lens is less than 250 µm, this will have an adverse effect on the optical performance of the optical unit. If the distance vertex first lens and vertex second lens is more than 650 µm, optical units exhibiting an insufficient picture quality will be obtained. Consequently it is in particular preferable to select a value for the distance vertex first lens and vertex second lens that falls within the range of 400-500 µm in which range an optimum balance is obtained between the dimension of the optical unit and the optical performance obtained therewith.

In a special embodiment of the present optical unit, it is furthermore preferable if a third lens is disposed behind the second lens, seen in the direction from the object side to the imaging surface, which third lens abuts against a substrate, whilst in particular a fourth lens abuts against the substrate, seen in the direction of the imaging surface. In such an embodiment, a diaphragm function may be present in the light path between the third and the fourth lens.

In the special embodiment of the present optical unit, in which four lenses are provided, viz. a first lens, a second lens, a third lens and a fourth lens, it is desirable from the viewpoint of optical performance if the ratio between the distance [(vertex first lens) and (vertex second lens)] and the distance [(vertex third lens) and (vertex fourth lens)] ranges between 0.4 and 0.7.

The diaphragm used in the present application is preferably a non-transparent carrier, with the diaphragm function being realised by forming an opening or aperture in the non-transparent carrier, which opening or aperture is transparent to incident light from the object side. The thickness of the carrier is in particular 10-500 µm, preferably 20-400 µm. In one embodiment, the aperture in the non-transparent carrier has inwardly, downwardly sloping edges, which edges form an angle ranging between 0 and 90 degrees, preferably between 10 and 50 degrees. In one embodiment, such edges are configured so that the dimension of the aperture in the non-transparent carrier on the side where the light is incident is smaller than the dimension of the aperture in the non-transparent carrier on the side where the light exits.

From the viewpoint of mechanical strength and ease of handling, it is preferable if the non-transparent carrier is a metal carrier, in particular if the aperture is filled with a material that is transparent to incident light. The non-transparent carrier can serve as a substrate on which lenses can be formed, preferably by using a replication method. Suitable carriers are made of a metal, such as aluminium, copper, tin, gold and alloys thereof, among which steel. In a special embodiment, silicon, a ceramic material or even a plastic material can be used as the carrier material.

In one embodiment, a possibility for manufacturing the present optical unit comprises the provision of a non-transparent aperture plate by punching, etching, or drilling plates from the desired carrier material, such as metal, silicon or plastic. The aforesaid plate can also be obtained by means of an injection-moulding technique. The aperture in the non-transparent (to incident light) carrier can subsequently be filled with an optical material, for example using a replication process. A first lens surface can subsequently be obtained by using a replication process, just like a second lens surface can be provided by replication. In one embodiment, the aforesaid steps of filling and replicating can be combined, in particular in dependence on the optical materials that are used.

According to the present inventors, it is possible to configure the optical unit such that the first lens is made of a material different from the material of which the second lens is made.

To realise an optimum optical performance, the material used for the first lens is preferably a polymer, which polymer has an Abbe number of 40-80 and a refractive index of 1.4-1.7, whilst furthermore preferably the material used for the second lens is a polymer, which polymer has an Abbe number of 20-50 and a refractive index of 1.4-1.7.

The present invention will now be explained with reference to a number of embodiments, in a special embodiment of which it is preferably if the diaphragm is fully embedded in the material used for the first lens. According to another embodiment of the optical unit, it is preferably if the diaphragm abuts against the second lens.

The first and the second lens may be made of a same polymer material, with the two polymer materials having corresponding Abbe number and refractive index values.

It is in particular preferable if the material used for the third lens is a polymer, which polymer has an Abbe number of 20-60 and a refractive index of 1.4-1.7, in which regard it is furthermore preferable if the material used for the fourth lens is a polymer, which polymer has an Abbe number of 20-60 and a refractive index of 1.4-1.7.

In another, preferred embodiment of the present optical unit, the diaphragm is preferably fully embedded in the material used for the second lens, whilst in a special embodiment it is preferable if the diaphragm abuts against the first lens.

Suitable lens shapes include: plano-convex for the first lens, plano-concave for the second lens, plano-concave for the third lens and plano-convex for the fourth lens, whilst it is also possible to configure the fourth lens as a combined plano-convex-concave lens.

In the embodiment described above, in which the substrate is in particular disposed between the third and the fourth lens, it is preferable from the viewpoint of light transmission if the substrate comprises a transparent glass plate.

From the viewpoint of dimensional precision and reproducibility and effecting variations in Abbe number and refractive index, it is preferable if the first, the second, the third and the fourth lens are obtained by using a replication method. Suitable UV-curable compositions for use as a polymer in the replication method include: polycarbonates, among which diethylene glycolbis(allyl)carbonate, polystyrenes, among which polychloro styrene, polyacrylates, such as poly(trifluoroethylmethacrylate), poly(iso-butylmethacrylate), poly(methylacrylate), poly(methylmethacrylate), poly(alphamethyl-bromium acrylate), poly(methacrylic acid)-2,3-dibromium propylpoly(phenyl-methacrylate-poly (pentachloro phenylmeth-acrylate polymer), polyester compounds such as diallyl-phtalate, poly(vinylbenzoate), poly(vinylnaphtalene), poly(vinylcarbazole) and silicones in the form of various types of resin materials, as well as acrylic resin, urethane resin, epoxy resin, enthiol resin, or thiourethane resin or photo polymer. Exposure preferably takes place at an intensity of 100-2000 W/cm2, in particular 700 W/cm2, and a dose of 1-15 J/cm2, in particular 7 J/cm2, a wavelength in the 320-400 nm range and an exposure time of 1-60 seconds, in particular 10 seconds.

A suitable transparent glass plate for the substrate is a substrate which has an Abbe number of 20-90 and a refractive index of 1.2-2.2.

In a special embodiment, the substrate may be built up of a number of layers, each layer exhibiting a different optical behaviour, if desired, making it possible to influence the optical performance of the optical unit as desired.

It is also possible to integrate optically correcting functions in the present optical unit, viz. an anti-reflection function and/or an infrared filter function.

The present optical unit is in particular used in image processing units where small dimensions are essential, such as camera units for mobile telephones, personal computers, digital camera, game computers, surveillance cameras and the like, which employ CCD or CMOS.

The present invention will be explained hereinafter by means of a number of examples, in which connection it should be noted, however, that the present invention is by no means limited to such embodiments.

Figure 1:
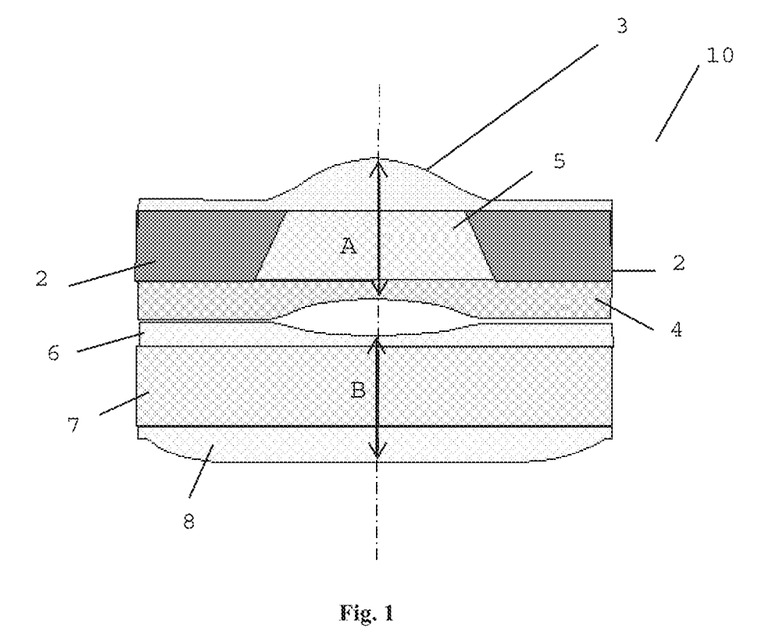
FIG. 1 is a front view of an optical unit according to the present invention.

FIG. 1 shows an optical unit 10 comprising a first lens 3, a diaphragm 2, a second lens 4, a third lens 6, a substrate 7 and the fourth lens 8. In FIG. 1, letter A schematically indicates the distance vertex first lens and vertex second lens. Letter B relates to the distance vertex third lens and vertex fourth lens.

The present invention in particular relates to a value A in the 250-650 μm range. Furthermore it is preferable if the ratio A/B varies between 0.4 and 0.7, preferably it is 0.5. The diaphragm 2 is a metal carrier, in which the aperture is schematically indicated at 5. The aperture 5 present in the non-transparent carrier 2 has inwardly, downwardly sloping edges in this embodiment, which edges form an angle of 30 degrees. In this embodiment, such edges are constructed so that the dimension of the aperture 5 in the non-transparent carrier 2 on the side where the light is incident is smaller than the dimension of the aperture 5 in the non-transparent carrier 2 on the side where the light exits. By configuring the diaphragm 2 as a non-transparent carrier, the incident light will enter the optical unit 10 via the lens 3, and subsequently exit via the aperture 5, the second lens 4, the third lens 6, the substrate 7 and the fourth lens 8. From FIG. 1 it furthermore follows that the first lens 3 is disposed on the diaphragm 2, with the diaphragm 2 being provided with a second lens 4 on the side remote therefrom. For the first lens a refractive index of 1.52 and an Abbe number of 53.7 is used, for the second lens a refractive index of 1.61 and an Abbe number of 28.5, for the third lens a refractive index of 1.54 and an Abbe number of 41 and for the fourth lens a refractive index of 1.54 and an Abbe number of 41.

Figure 2:
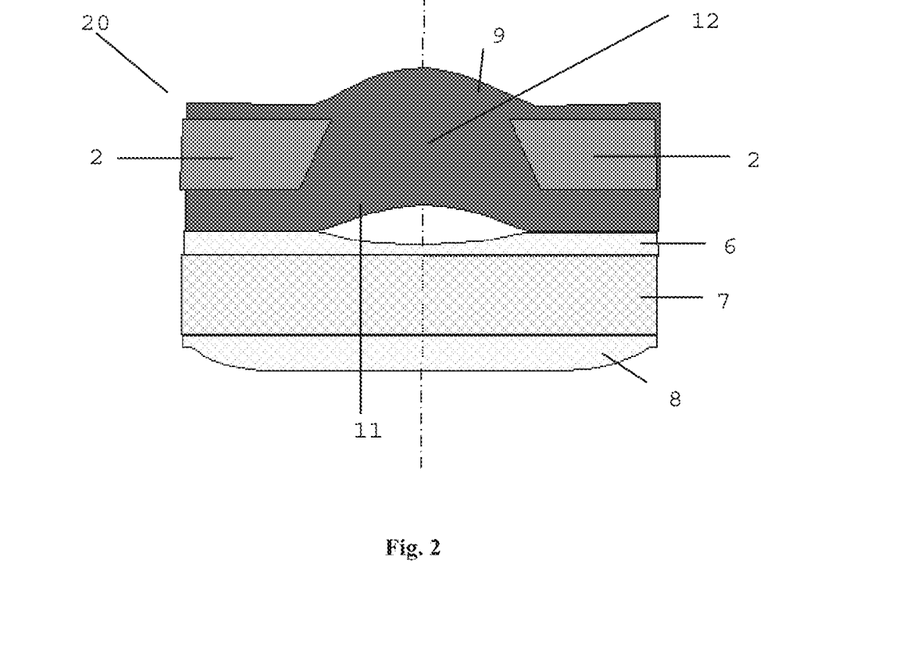
FIG. 2 shows a special embodiment of an optical unit according to the present invention.

FIG. 2 shows a special embodiment of an optical unit 20, in which the diaphragm 2 is fully embedded in the first lens 9 and the second lens 11. In FIG. 2, the material used for the first lens 9 is optically identical to the material used for the second lens 11. The aperture 12 is disposed between the diaphragm parts 2 shown both on the left-hand side and on the right-hand side of the optical unit 20.

Figure 3:
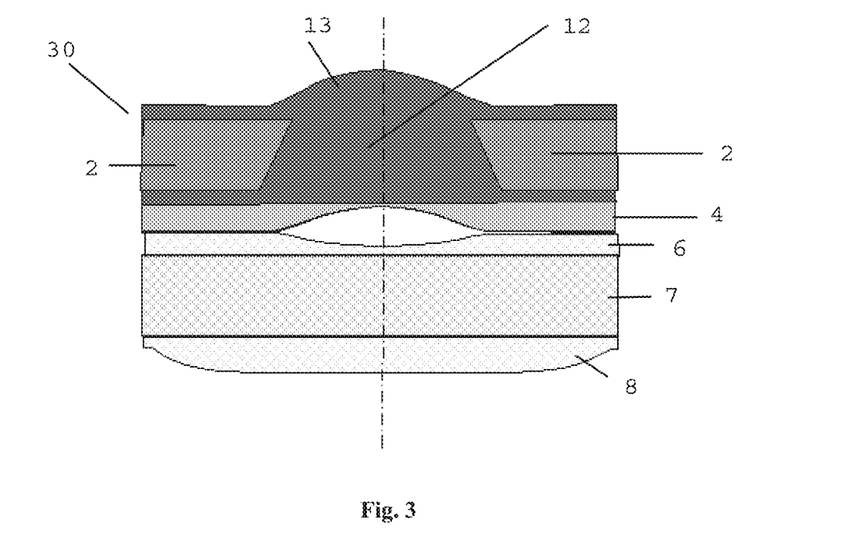
FIG. 3 shows a special embodiment of an optical unit according to the present invention.

FIG. 3 shows a special embodiment of an optical unit 30, in which the diaphragm 2 is fully embedded in the material used for the first lens 13. The diaphragm 2 is embedded in the material used for the first lens 30 in such a manner that the second lens 4 abuts against the material used for the first lens 13.

Figure 4:
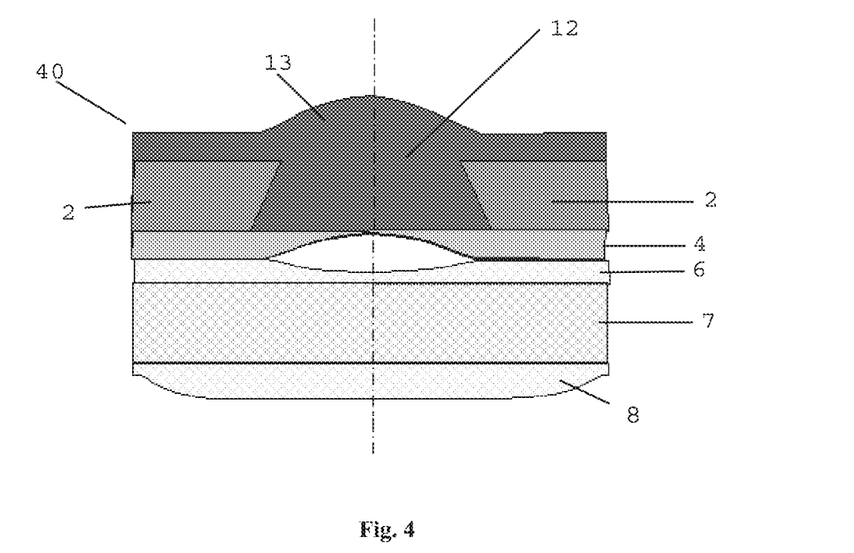
FIG. 4 shows a special embodiment of an optical unit according to the present invention.

FIG. 4 shows an optical unit 40, viz. a special embodiment of the optical unit 30 shown in FIG. 3. In the optical unit 40, the diaphragm 2 is also embedded in the material used for the first lens 13, but the second lens 4 abuts against the diaphragm 2.

Figure 5:
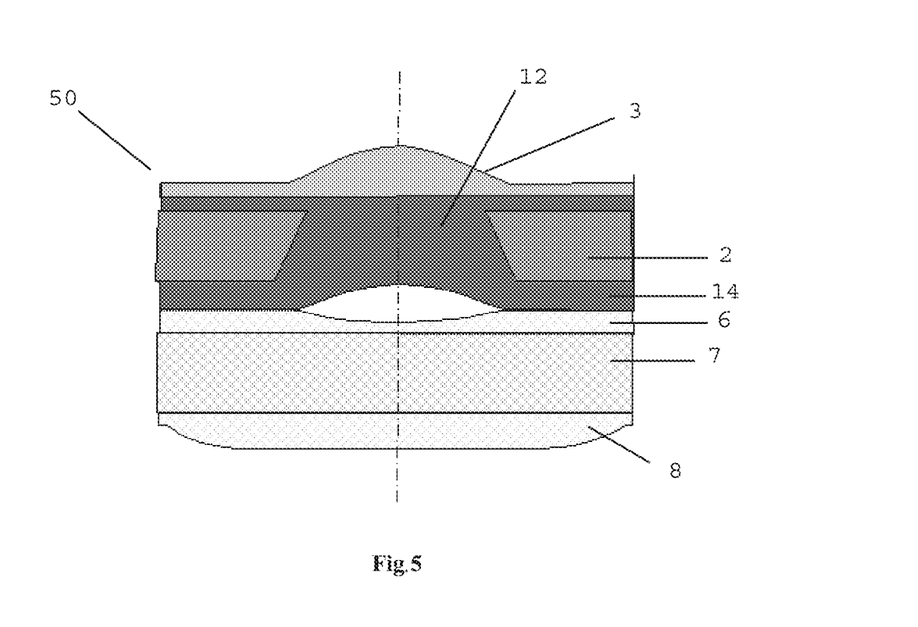
FIG. 5 shows a special embodiment of an optical unit according to the present invention.

FIG. 5 shows a special embodiment of the present optical unit 50, in which the diaphragm 2 is fully embedded in the material used for the second lens 14. Because the diaphragm 2 is fully embedded in the material used for the second lens 14, the first lens 3 abuts against the material used for the second lens 14.

Figure 6:
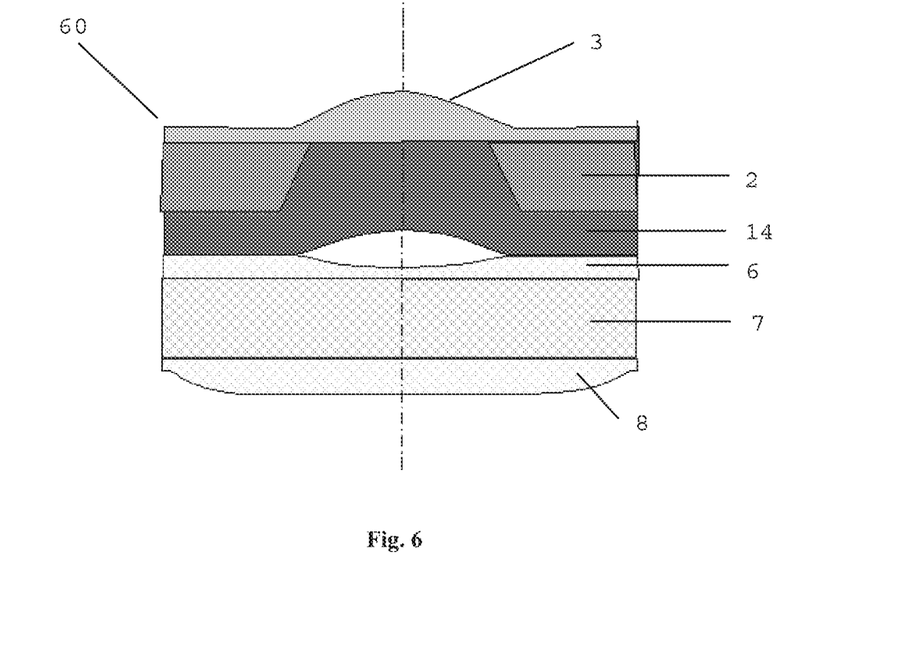
FIG. 6 shows a special embodiment of an optical unit according to the present invention.

FIG. 6 shows the present optical unit 60, being a special embodiment of the optical unit 50 shown in FIG. 5, in which, as shown in FIG. 6, the diaphragm 2 is not fully embedded in the material used for the second lens 14, but the first lens 3 abuts against the diaphragm 2.

Although the optical units shown in the preceding figures all comprise a single aperture for performing the diaphragm function, it is possible in certain embodiments to use more than one aperture. The aperture in the non-transparent carrier used in FIGS. 1-6 in all cases has inwardly, downwardly sloping edges in these embodiments, which edges form an angle of 30 degrees. Such edges are configured so that the dimension of the aperture in the non-transparent carrier on the side where the light is incident is smaller than the dimension of the aperture in the non-transparent carrier on the side where the light exits. It should be understood, however, that the angle of 30 degrees shown in FIGS. 1-6 must not be construed as being limitative. Further it is possible in certain embodiments that one or more diaphragm functions are additionally obtained in the present optical unit by using thin-layer techniques, such as chrome coating, in particular at positions different from the aforesaid positions.

Figure 7:
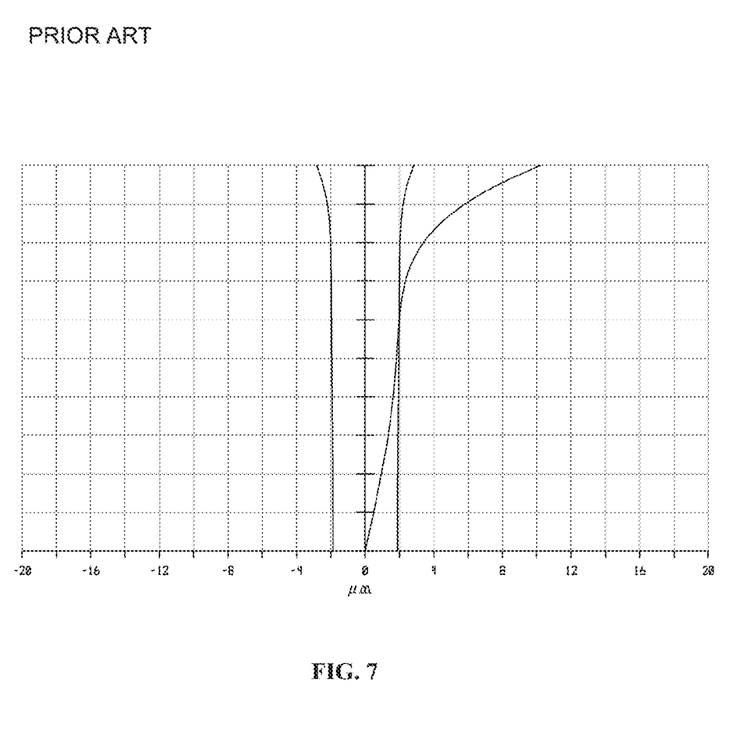
FIG. 7 shows the optical performance of an optical unit according to the prior art.
Figure 8:
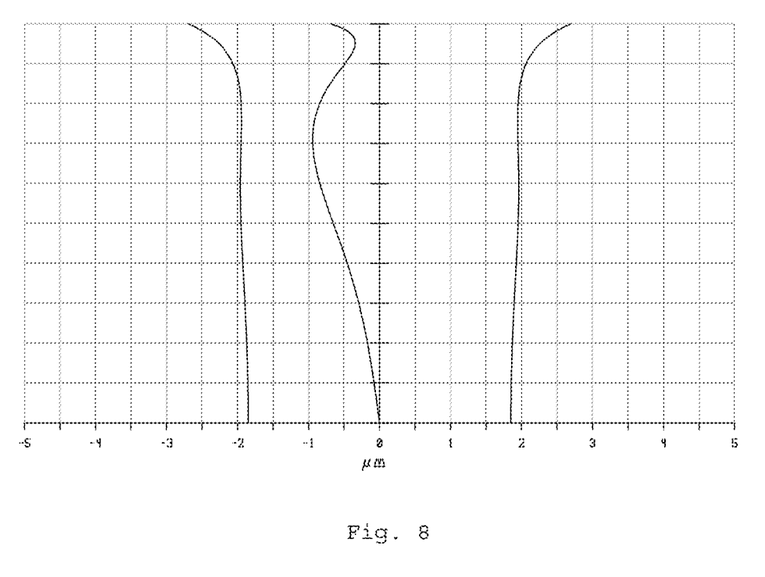
FIG. 8 shows the optical performance of an optical unit according to the present invention.
Figure 13:
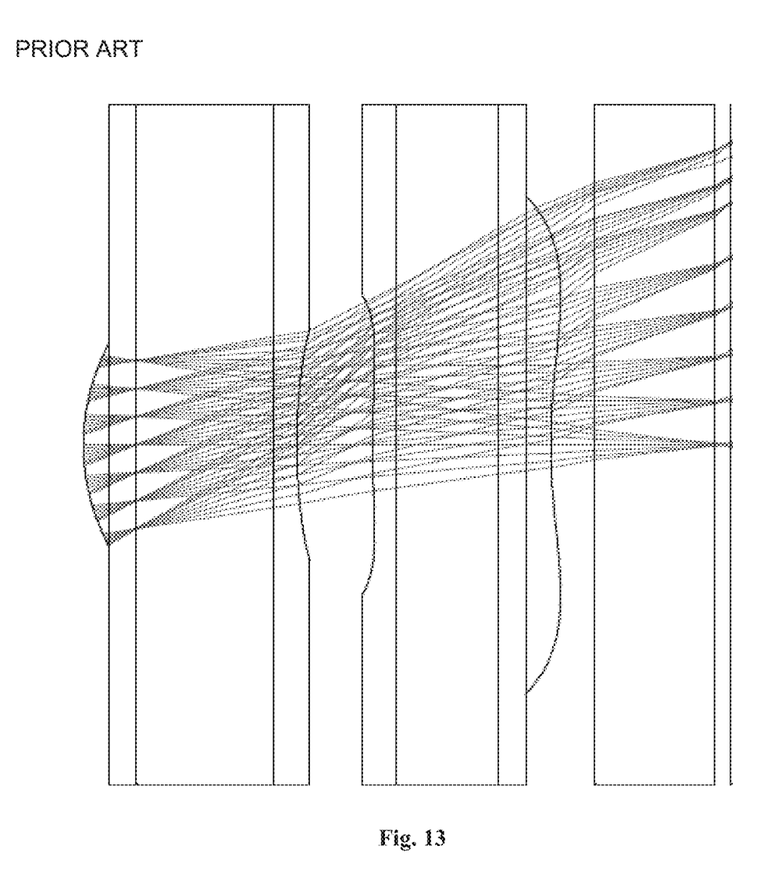
FIG. 13 shows an optical unit according to the prior art and the associated ray path.
Figure 14:
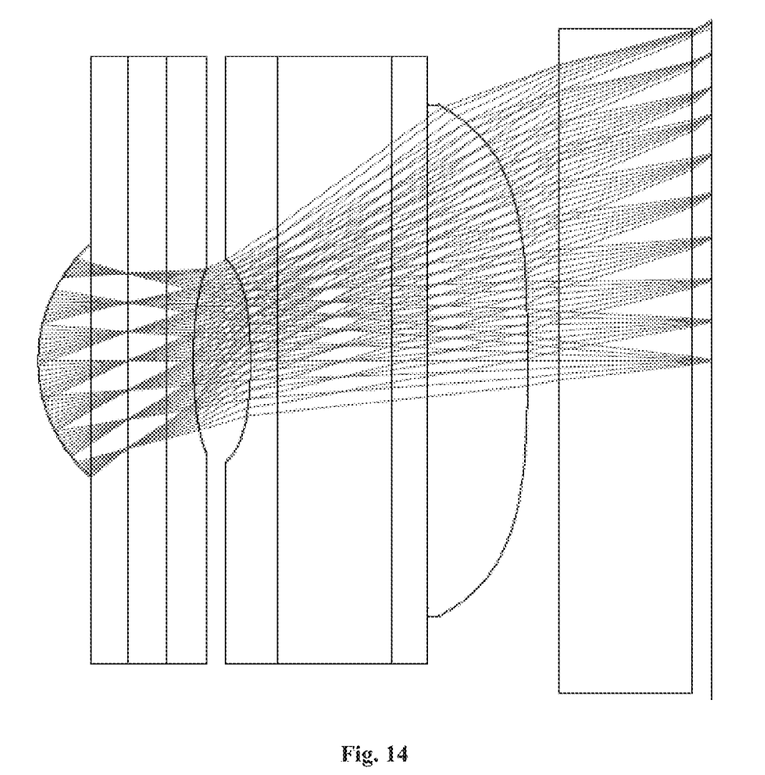
FIG. 14 shows an optical unit according to the present invention and the associated ray path.

FIG. 7 and FIG. 8 show the optical performance of a lens assembly according to the prior art and a lens assembly according to the present invention, respectively, in particular a lens assembly as schematically shown in FIG. 1, with FIG. 8 clearly showing that the lateral colour dispersion around 0 μm is much smaller than in the optical unit according to the prior art shown in FIG. 7. The lens assembly according to the prior art and the lens assembly according to the present invention used in FIGS. 7 and 8 and the associated ray paths are schematically shown in FIGS. 13 and 14, respectively.

Figure 9:
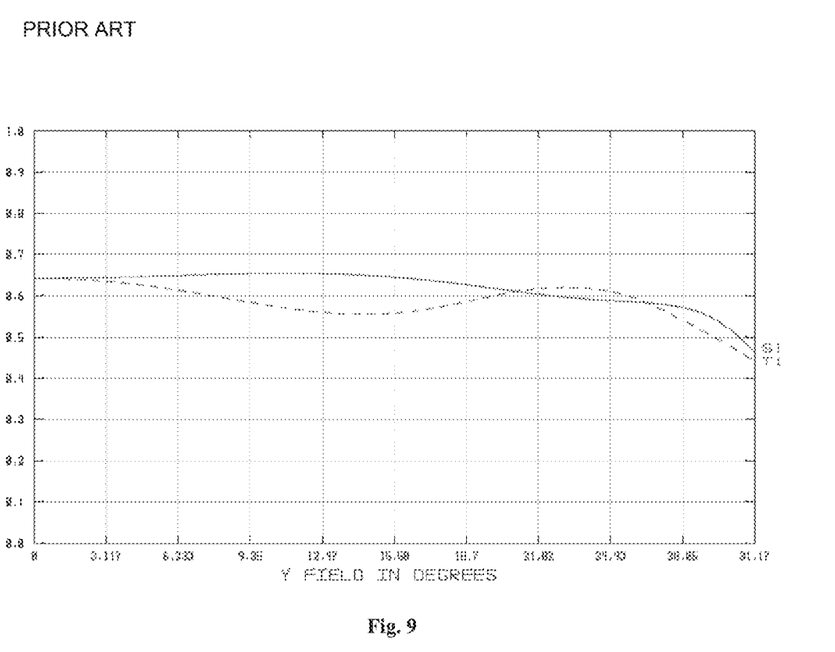
FIG. 9 shows the optical performance of an optical unit according to the prior art.
Figure 10:
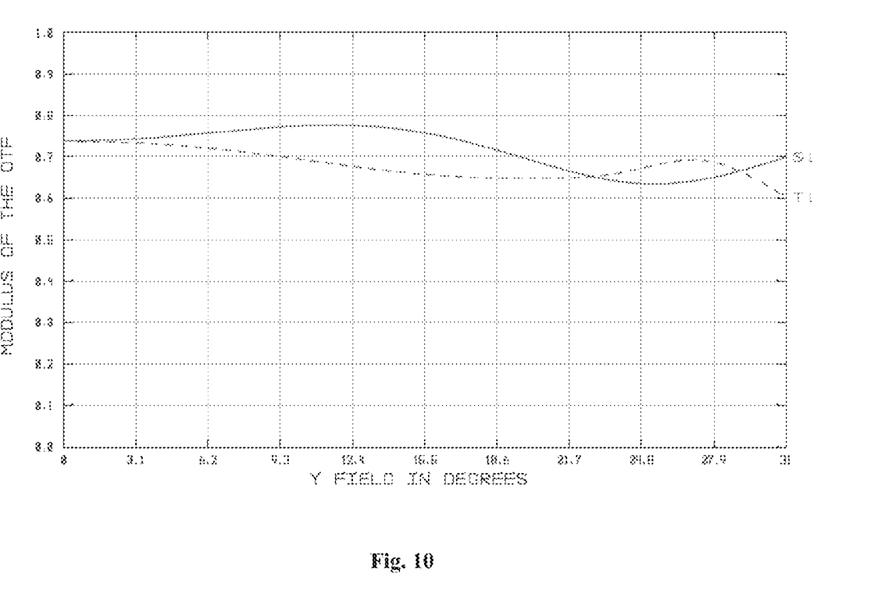
FIG. 10 shows the optical performance of an optical unit according to the present invention.

FIG. 9 and FIG. 10 show the optical performance of an optical unit according to the prior art and of an optical unit according to the present invention, respectively, with FIG. 10 clearly showing that the MTF modulus is about 10% higher than the modulus shown in FIG. 9, viz. an optical unit according to the prior art, over a large range of degrees.

Figure 11:
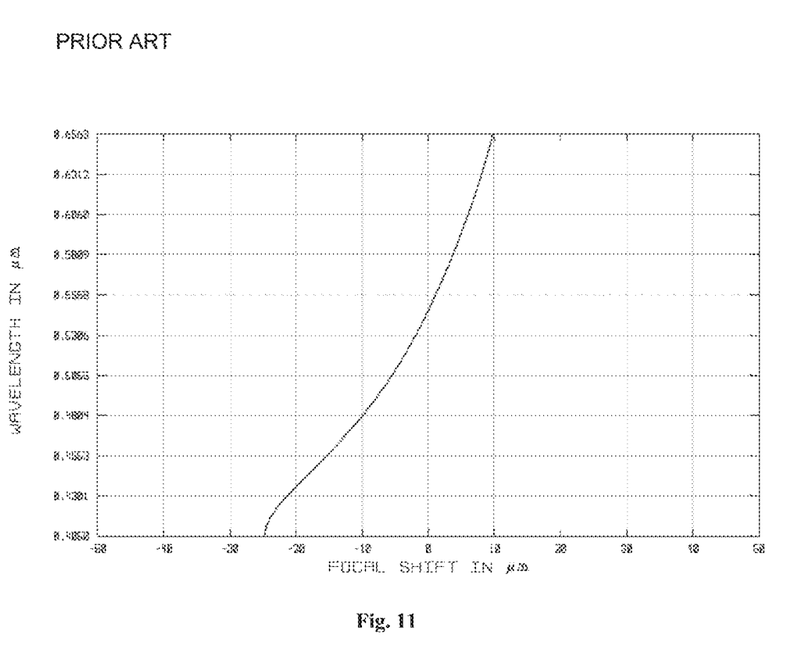
FIG. 11 shows the optical performance of an optical unit according to the prior art.
Figure 12:
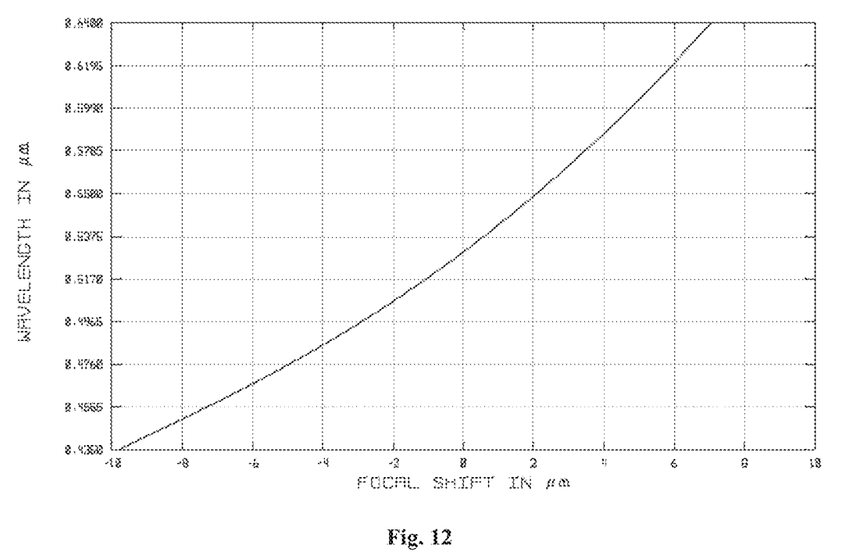
FIG. 12 shows an optical unit according to the present invention.

FIG. 11 and FIG. 12 show the focal shift for an optical unit according to the prior art and for an optical unit according to the present invention, respectively, with the optical unit according to the present invention shown in FIG. 12 exhibiting a much smaller focal shift as a function of the wavelength in comparison with the focal shift as observed in an optical unit according to the prior art (FIG. 11).

The optical performance shown in FIGS. 7-12 clearly show that, using the present optical unit, in which the distance vertex first lens and vertex second lens is limited to a special area.

FIGS. 13 and 14 schematically show optical units according to the prior art and according to the present invention, respectively. From the schematically illustrated ray path it is apparent that in FIG. 14 a better focussing takes place than in FIG. 13.

The invention claimed is:

1. An optical unit comprising, seen in the direction from the object side to the imaging surface, a first lens, a second lens and a diaphragm present in the light path between the first lens and the second lens, wherein a distance between the vertex of the object side surface of the first lens and the vertex of the image-side surface of the second lens along an optical axis is 250-650 μm, wherein the diaphragm is a non-transparent carrier provided with an opening which is transparent to incident light from the object side, which carrier in particular has a thickness of 10-500 µm, preferably 20-400 µm, wherein seen in the direction from the object side to the imaging surface, a third lens is disposed behind the second lens, which third lens abuts against a substrate, wherein a fourth lens abuts against the substrate, seen in the direction of the imaging surface, wherein the ratio between the distance between the vertex of the object side surface of the first lens and the vertex of the image-side surface of the second lens along an optical axis and the distance between the vertex of the object side surface of the third lens and the vertex of the image-side surface of the fourth lens along an optical axis ranges between 0.4 and 0.7.

2. The optical unit of claim 1, wherein the distance between the vertex of the object side surface of the first lens and the vertex of the image-side surface of the second lens along an optical axis is 400-500 µm.

3. The optical unit of claim 1, wherein a diaphragm function is present in the light path between the third and the fourth lens.

4. The optical unit of claim 3, wherein the ratio between the distance between the vertex of the first lens and the vertex of the second lens and the distance between the vertex of the third lens and the vertex of the fourth lens ranges between 0.4 and 0.7.

5. The optical unit of claim 1, wherein the non-transparent carrier is a metal carrier, in particular that the opening is filled with a material that is transparent to incident light.

6. The optical unit of claim 1, wherein the material used for the first lens is a polymer, which polymer has an Abbe number of 40-80 and a refractive index of 1.4-1.7.

7. The optical unit of claim 1, wherein the material used for the second lens is a polymer, which polymer has an Abbe number of 20-50 and a refractive index of 1.4-1.7.

8. The optical unit of claim 1, wherein the diaphragm is fully embedded in the material used for the first lens.

9. The optical unit of claim 1, wherein the diaphragm abuts against the second lens.

10. The optical unit of claim 1, wherein the material used for the third lens is a polymer, which polymer has an Abbe number of 20-60 and a refractive index of 1.4-1.7.

11. The optical unit of claim 1, wherein the material used for the fourth lens is a polymer, which polymer has an Abbe number of 20-60 and a refractive index of 1.4-1.7.

12. The optical unit of claim 1, wherein the diaphragm is fully embedded in the material used for the second lens.

13. The optical unit of claim 1, wherein the diaphragm abuts against the first lens.

14. The optical unit of claim 1, wherein the substrate comprises a transparent glass plate.

15. The optical unit of claim 1, wherein the first, the second, the third and the fourth lens have been obtained by using a replication method.

16. The optical unit of claim 1, wherein the substrate has an Abbe number of 20-90 and a refractive index of 1.2-2.2.

17. The optical unit of claim 1, wherein an opening that is present in a non-transparent carrier has inwardly, downwardly sloping edges, which edges form an angle of 0-90 degrees, in particular 10-50 degrees, said edges being configured so that the dimension of the opening in the non-transparent carrier on the side where the light is incident is smaller than the dimension of the opening in the non-transparent carrier on the side where the light exits.

18. An optical unit comprising, seen in the direction from the object side to the imaging surface, a first lens, a second lens and a diaphragm present in the light path between the first lens and the second lens, wherein a distance between the vertex of the object side surface of the first lens and the vertex of the image-side surface of the second lens along an optical axis is 250-650 µm, wherein the diaphragm is a non-transparent carrier provided with an opening which is transparent to incident light from the object side, which carrier in particular has a thickness of 10-500 µm, preferably 20-400 µm, wherein, seen in the direction from the object side to the imaging surface, a third lens is disposed behind the second lens, which third lens abuts against a substrate, wherein a fourth lens abuts against the substrate, seen in the direction of the imaging surface, wherein a diaphragm function is present in the light path between the third and the fourth lens, wherein the ratio between the distance between the vertex of the first lens and the vertex of the second lens and the distance between the vertex of the third lens and the vertex of the fourth lens ranges between 0.4 and 0.7.

19. An optical unit comprising, seen in the direction from the object side to the imaging surface, a first lens, a second lens and a diaphragm present in the light path between the first lens and the second lens, wherein a distance between the vertex of the object side surface of the first lens and the vertex of the image-side surface of the second lens along an optical axis is 250-650 µm, wherein an opening that is present in a non-transparent carrier has inwardly, downwardly sloping edges, which edges form an angle of 0-90 degrees, in particular 10-50 degrees, said edges being configured so that the dimension of the opening in the non-transparent carrier on the side where the light is incident is smaller than the dimension of the opening in the non-transparent carrier on the side where the light exits.

20. An optical unit comprising, seen in the direction from the object side to the imaging surface, a first lens, a second lens and a diaphragm present in the light path between the first lens and the second lens, wherein a distance between the vertex of the object side surface of the first lens and the vertex of the image-side surface of the second lens along an optical axis is 250-650 µm, wherein the diaphragm is a non-transparent carrier provided with an opening which is transparent to incident light from the object side, which carrier in particular has a thickness of 10-500 µm, preferably 20-400 µm, wherein the diaphragm is fully embedded in the material used for the first lens, and/or the diaphragm is fully embedded in the material used for the second lens.

* * * * *